United States Patent [19]

Meyer

[11] Patent Number: 6,061,602
[45] Date of Patent: May 9, 2000

[54] METHOD AND APPARATUS FOR DEVELOPING APPLICATION SOFTWARE FOR HOME AUTOMATION SYSTEM

[75] Inventor: Frank Meyer, Milford, Mich.

[73] Assignee: Creative Lifestyles, Inc., Milford, Mich.

[21] Appl. No.: 09/103,210

[22] Filed: Jun. 23, 1998

[51] Int. Cl.$^7$ .................................................. G05B 19/42
[52] U.S. Cl. ................................................ 700/83; 700/85
[58] Field of Search .......................... 709/2; 700/83, 700/249, 86, 179, 85

[56] References Cited

U.S. PATENT DOCUMENTS

| | | | |
|---|---|---|---|
| 4,462,046 | 7/1984 | Spight | 348/94 |
| 4,679,137 | 7/1987 | Lane et al. | 364/188 |
| 4,759,074 | 7/1988 | Iadipaolo et al. | 382/152 |
| 4,833,624 | 5/1989 | Kuwahara et al. | 395/84 |
| 4,914,567 | 4/1990 | Lipkis et al. | 364/188 |
| 5,005,119 | 4/1991 | Rumbaugh et al. | 395/671 |
| 5,157,663 | 10/1992 | Major et al. | 395/182.08 |
| 5,327,350 | 7/1994 | Endo | 364/474.21 |
| 5,383,110 | 1/1995 | Fujita et al. | 364/191 |
| 5,453,933 | 9/1995 | Wright et al. | 364/474.23 |
| 5,481,712 | 1/1996 | Silver et al. | 395/701 |
| 5,485,620 | 1/1996 | Sadre et al. | 395/710 |
| 5,511,147 | 4/1996 | Abdel-Malek | 395/99 |
| 5,574,828 | 11/1996 | Haywood et al. | 706/45 |
| 5,742,504 | 4/1998 | Meyer et al. | 364/188 |
| 5,905,649 | 5/1999 | Sojoodi et al. | 700/83 |
| 5,920,479 | 7/1999 | Sojoodi et al. | 700/86 |
| 5,933,353 | 8/1999 | Abroa, et al. | 700/182 |
| 5,940,296 | 8/1999 | Meyer | 700/83 |
| 5,988,852 | 11/1999 | Nakanishi | 700/83 |
| 5,995,877 | 11/1999 | Brueggemann et al. | 700/85 |

OTHER PUBLICATIONS

"The integration of Programmable Logic Controllers with a Micro–computer as a novel tool for industrial automation" by F. Artuad, Canfield Institute of Technology, 1986.

Primary Examiner—William Grant
Assistant Examiner—Chad Rapp
Attorney, Agent, or Firm—Young & Basile, PC

[57] ABSTRACT

An interactive graphical application program combines a graphical command language and a control program to enable a user to graphically select and generate an automation sequence to control an automation application. A computer system stores a first program containing flow sequences and a set of controls representing possible hardware for use in the automation application. Structure is graphically displayed depicting each sequence step and transition to the next step in accordance with user selections. The first program is automatically linked with the controls to enable an application software program to be generated in response to user commands.

6 Claims, 4 Drawing Sheets

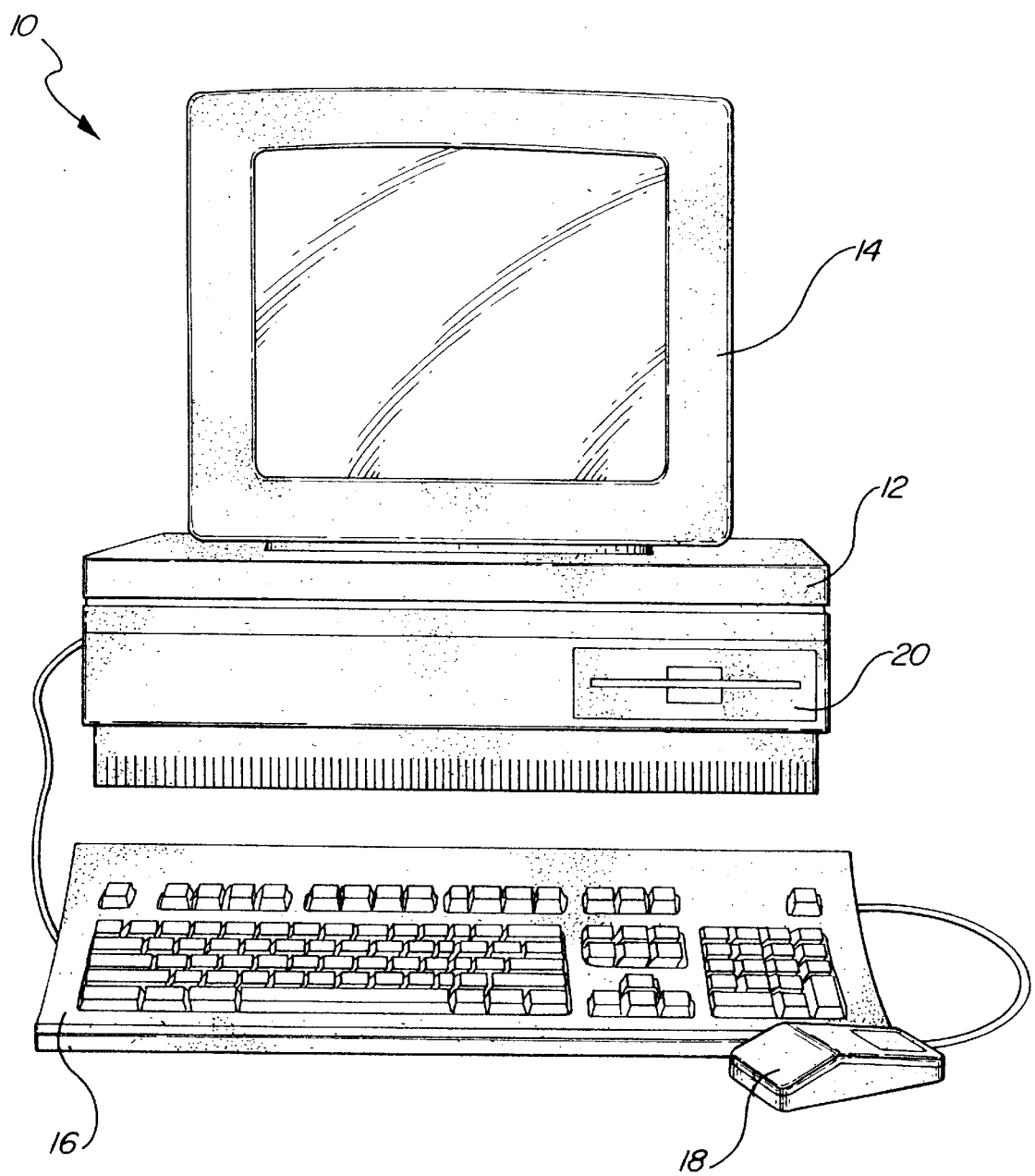

METHOD AND APPARATUS FOR DEVELOPING APPLICATION SOFTWARE FOR HOME AUTOMATION SYSTEM

BACKGROUND OF THE INVENTION

This invention relates, in general, to methods and apparatus for interactively developing a graphical control flow structure and associated application software for home automation systems.

Description of the Art

The operation of industrial machines and processes are typically controlled by a central controller, such as a programmable logic controller or PLC. Basically, a PLC includes a processing unit with a control program stored in a memory, input modules and output modules. The processor, when executing the control program, will control the operative state of the various outputs, typically "on" or "off", in response to the detection of various external inputs. Such PLCs typically include a unique programming language, such as ladder logic or Boolean, which are fairly common in the industrial machine industry.

Various programming standards have been developed for use in developing application programs for PLCs. Grafcet is a graphical programming language originally developed by AFCET (Association Francais Pour La Cybernetique Economique et Technique) and has now become an international PLC programming language. IEC 1131 is a standard established by the International Electrotechnical Commission that specifies the syntax and semantics of a unified suite of programming language for programmable logic controllers. Part of the standard refers to sequential function charts that is Grafcet like in structure.

Other control software is also available. ActiveX Controls is a name defined by Microsoft Corporation for programmable elements. An ActiveX control is an object that when instantiated embodies both specific data and the functions that manipulate it. The ActiveX control or component is an entity that has state, behavior and identity. An object's state consists of its attributes or properties and the attributes' current values. An object's behavior consists of the operations or methods that can be performed on it and the accompanying state changes. An object's identity is what is used to distinguish it from other objects. An ActiveX component has events that inform when something has happened. In general, each ActiveX component can have methods, e.g., grinding, inspecting, etc., properties, e.g., grinding speed, number of passes, etc., and events, such as grinding complete. An instantiated ActiveX control is one which has been created as opposed to being simply known about. A computer program may know what ActiveX controls are available, but only when it creates one of these controls does it exist, e.g., it is instantiated. The same control may be instantiated many times or just once. Several methods can be called on any instantiated control.

In developing any application program, the program developer typically generates written code using various symbols or instructions required by the particular software program. However, syntax errors are frequent when developing such code. These errors must be found and corrected which increases the amount of program development time. The use of graphical based languages, such as Grafcet and its IEC 1131 subset, avoid the actual writing of code and enable an application developer to establish the parameters of the application process through the use of graphical symbols.

Attempts have also been made to combine graphical-control or standards languages with other software programs to enable an application developer to quickly and easily develop graphical based application software for use in a particular application. U.S. Pat. No. 5,742,504, of which the present applicant is a co-inventor, describes a method and system for quickly developing application software for use in a machine vision system. Commands and sets of instructions are received from a user to select a first custom control program of desired machine vision components, desired hardware operating parameters of the hardware and a second custom control program of desired machine vision algorithms. The first control program is linked with the desired hardware operating parameters to the second control program to form the application software. Attempts have also been made to develop graphical control-flow application software for use in a machine vision system by interactively linking the ActiveX standard with Grafcet or its IEC 1131 subset to enable an application developer to develop graphical-flow application software for a machine vision system. However, such attempts to generate graphical-flow application software have been restricted solely to the machine vision industry.

Thus, it would be desirable to provide a method and apparatus for interactively developing application software for use in industrial automation or home automation applications where the application software developer utilizes a graphical image sequence without the need to write alphanumeric code. It would also be desirable to provide a programmed computer which queries the user's intentions and guides the user's choices until the particular application software is developed. It would also be desirable to provide a method and apparatus for interactively developing application software for use in industrial and home automation wherein the method and apparatus integrate standard third party controls, such as ActiveX controls, with a graphical programming language, such as Grafcet.

SUMMARY OF THE INVENTION

The present invention is an apparatus and method for interactively developing a graphical control application software program for use in controlling an automation apparatus or process.

In one embodiment, the apparatus includes means for storing an application development program including a first program representing a first set of flow sequences for operating an automation apparatus sequences. Means are provided for storing a plurality of controls for use in the automation apparatus. A display displays graphical representations of the flow sequence in the first program and the controls. A computer processor means receives commands from a user to select one of the flow sequences from the first program and one control. The display displays a structure wherein the graphical representation of the selected flow sequence is a step in the structure and the selected control is mapped into the structure at a step. The displayed structure also has at least one transition and at least one action. Means are also provided for linking the first program with the controls to form an application program in response to user commands without the need for writing program codes.

The present invention also contemplates a method for developing a graphical control program. In this embodiment, the method comprises the steps of:

storing a first control program representing a first set of flow sequences for use in operating an automation apparatus;

storing a plurality of controls for use in the automation apparatus;

displaying graphical representations of the controls;

receiving commands from a user to select one flow sequences from the first control program and to select one control;

linking the first control program with the controls; and displaying a graphical flow structure wherein the graphical flow structure includes the selected control mapped into the selected flow sequence.

The present apparatus and method enables an application developer to generate an application program to control an automation process, such as an industrial automation apparatus or process and a home automation process. The present invention uniquely combines a control program defining component standards with hardware suited for a particular automation application and a graphical flow program which prompts the user in generating the graphical flow sequence step by step and mapping into the sequence selected hardware and hardware operating parameters.

BRIEF DESCRIPTION OF THE DRAWINGS

The various features, advantages and other uses of the present invention will become more apparent by referring to the following detailed description and drawing in which:

FIG. 1 is a pictorial representation of an exemplary hardware configuration on which the present invention can be implemented;

DESCRIPTION OF THE PREFERRED EMBODIMENT

Figure 2A:
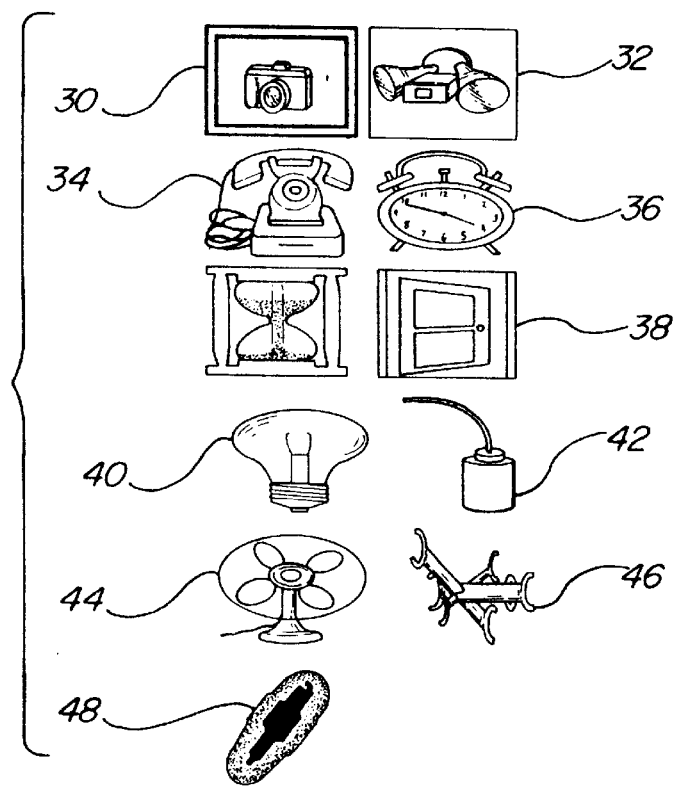
FIG. 2A is a pictorial representation of a programming menu containing home automation hardware icons representing the controls of the present inventions.

Referring now to the drawing, and to FIG. 1 in particular, there is depicted a computer system 10 on which the method and apparatus of the present invention can be implemented. The computer system 10 includes a central processing unit or CPU and a memory contained within a housing 12. A conventional monitor 14, keyboard 16 and pointing device 18, such as a mouse are connected to the CPU. A magnetic storage device 20 is also mounted in the housing 12.

The CPU and memory provides the development environment of a graphic, flow control language, such as Grafcet, for pictorially illustrating the sequence and interaction of an industrial automation system or a home automation system, for example.

Figure 2B:
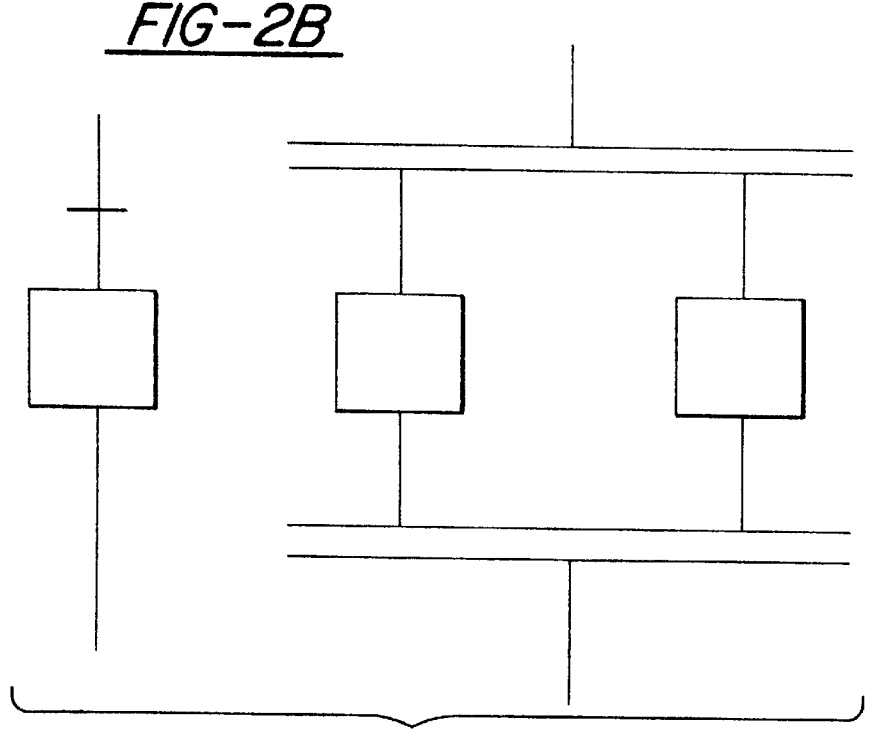
FIG. 2B is a pictorial representation of a programming menu containing the flow sequences in the first program.

FIGS. 2A and 2B illustrate various menu selectible icons which appear on the monitor 14 and which represent home automation hardware forming a set of controls and flow sequences forming a first program.

The following hardware is illustrated for a home automation application. It will be understood that different hardware icons may be provided for different applications, such as an industrial automation or machine control process.

As shown in FIG. 2A, the icons, as displayed on the display 14, include a security monitor icon 30, a nighttime icon 32, an alarm symbol 34, an alarm clock or timer 36 indicating wake-up or a morning time, a garage door icon 38, a light icon 40, a furnace oil pump icon 42, a furnace blower icon 44, a false repair icon 46 and a furnace ignitor icon 48. Other icons are also possible, for a home automation application. The icons or controls 30–48 shown in FIG. 2A may be used as ActiveX custom controls to interactively develop industrial automation or home automation applications or software programs in the Grafcet/IEC 1131 programming language.

In use, the industrial automation or home automation application is created by placing the custom controls or icons 30–48 in a menu. The properties for each of the controls or icons are then established. For example, each custom control has methods, such as timing, igniting, etc., properties, such as temperature, state, etc., and events, such as door closed, time of day, ignitor on, etc.

According to the present invention, Grafcet and/or its subset derivative IEC 1131 programming standard, is married together with the ActiveX standard to produce a programmable software or application program development system that does not require the use of standard software programming code. This provides the advantage of allowing any ActiveX component, such as any of the components 30–48 shown in FIG. 2A, to be inserted by a program developer within an environment that is particularly suited for a particular automation application, such as an industrial machine control application or a home automation application. Interrogation of the properties, methods and events of these ActiveX components can be used by the program developer to generate the control software without the use of any standard programming code. Properties and data of these controls can be exchanged between the various joined standards or programs.

The program developer can configure the application method and apparatus of the present invention by either a drag and drop or a menu system. The system of the present invention queries the programmer's intentions, and guides the programmer's choices until the application is fully developed.

The Grafcet language or program used in the present invention includes steps, transitions and actions. A step is represented by a box with a number or other symbol in it identifying the step or an icon selected from the menu in FIG. 2B.

Within the Grafcet/IEC 1131, each step in a Grafcet sequence represents a stable situation in an automation process and has one or more actions associated with it. It has been redefined in the present invention to represent an ActiveX component. Further, any of the complete Grafcet programs or sequences shown in FIGS. 3–5 and described hereafter can be, according to the present invention, redefined as a single ActiveX control.

As shown in FIG. 2B, the Grafcet program includes a number of selectible flow sequences, each including a transition and a step, with alternate conditional branches and parallel branches being possible as shown in FIG. 2B. A transition indicates the possibility of evolution from one step to the next. Within each transition there is an associated receptivity which is a function of input or variables or ActiveX controls. A transition in the Grafcet standard can be either a true state, an event generated by an ActiveX control, i.e., an ActiveX trigger control or a Boolean expression defined by an internal variable or properties of any control. Each transition is represented by a short horizontal bar across a vertical line.

One transition is provided automatically after each step. For example, a transition is either an event coming from an ActiveX control or a boolean expression which compares internally defined variables or properties of any instantiated control. Examples of boolean expressions are:

Time>3pm

ActiveXControl.property1t>10

ActiveXControl.result<=cos(AnotherActiveControl.property*2+10)
i.e. these expressions return true or false.

With each step, there are associated actions. Actions are typically application dependent, such as switching on the light, starting the furnace blower, starting an engine, starting a delay, incrementing or decrementing a counter, or any other operation.

Thus, according to the present invention, programming of a particular application sequence takes place through a graphical user interface. Existing ActiveX controls are integrated or linked into a Grafcet sequence. The step in the Grafcet standard has been redefined to also be an instantiated ActiveX control. Traditionally, a step in the Grafcet standard was an output. Thus, a transition has been redefined to include events from an ActiveX control or a boolean expression that compares properties of ActiveX controls.

Figure 3:
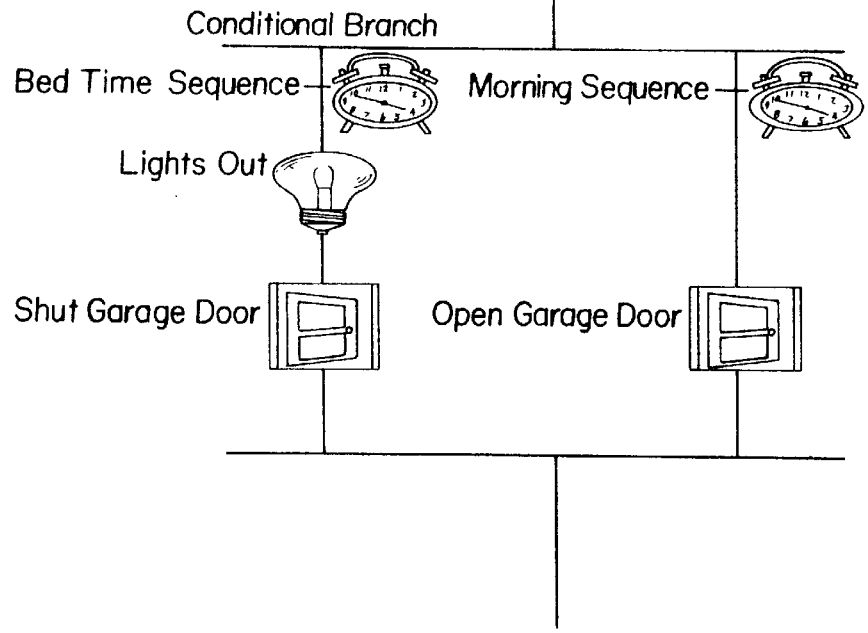
FIGS. 3, 4 and 5 are sample control programs developed in accordance with the teachings of the present invention.

In one example of creating a Grafcet control sequence according to the present invention, the developer or user selects one of the icons from the icon menu shown in FIG. 2A and drags and drops the selected icon 30–48 into a sequence display area on the monitor 14. FIG. 3 depicts an evening-morning graphical sequence. Transition and flow lines are selected from the menu shown in FIG. 2B and inserted into an initial one step loop to develop a flow chart that obeys the Grafcet programming rules.

When inputs are required before transaction to a next step, the user is prompted through a message displayed on the monitor 14 which also highlights or otherwise indicates the position for insertion of the input. The user selects inputs in the same way as the icons are selected, that is, for example, by dragging and dropping the selected input into the graphical sequence. Outputs from each step will be shown automatically.

Figure 4:
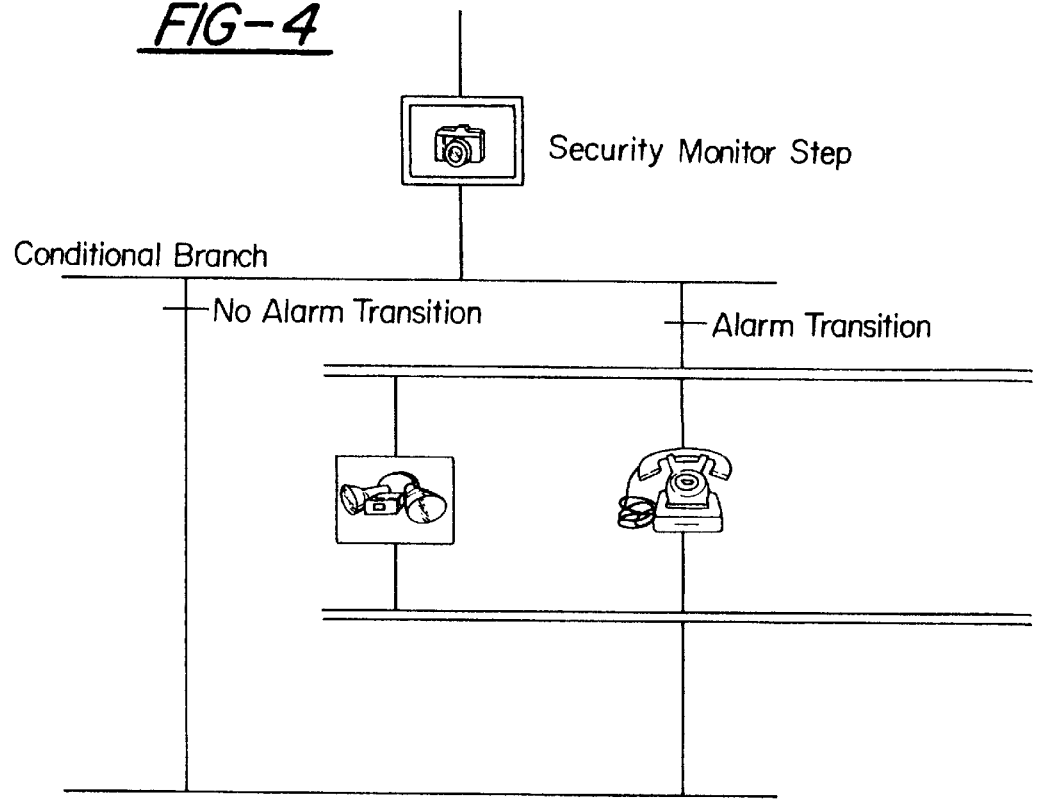
Figure 5:
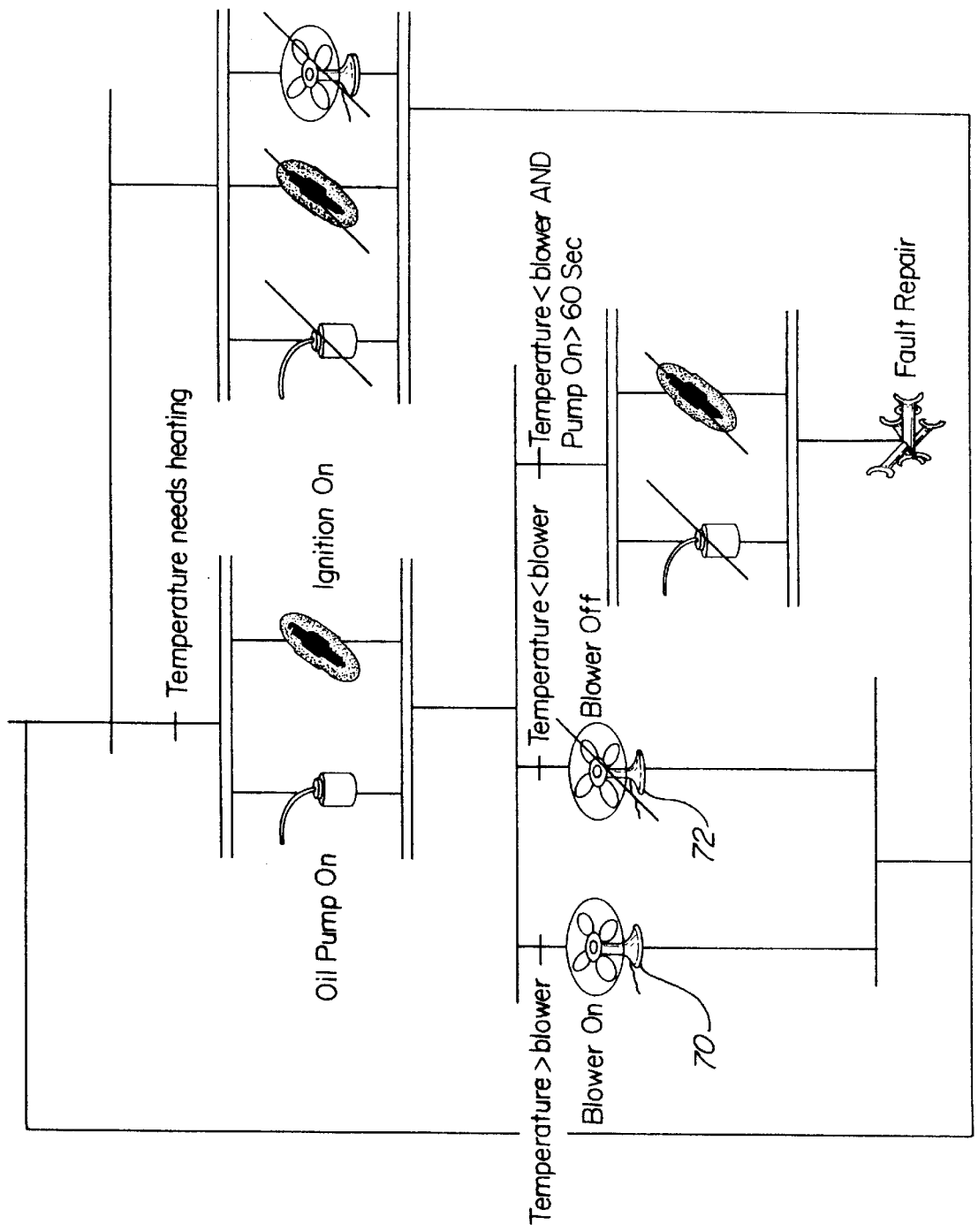

The user may also insert a parallel or conditional branch from the Grafcet menu into the sequence as shown in FIGS. 3–5.

As shown in FIG. 3, from an initial step, control switches through a conditional branch represented by a single horizontal line to either a morning or evening/bedtime sequence. This requires a time input to trigger one of the morning sequence or the bedtime sequence. In the bedtime sequence, a transition occurs to the next step in which a lights out event takes place. Subsequently, the next step occurs without a transition wherein garage door is closed.

In the corresponding morning sequence, control automatically advances to a step in which the garage door is opened.

FIG. 4 depicts a typical security control program which can be generated using the combined Grafcet/ActiveX controls. When a security monitor step 60 is selected, control conditionally branches to one of a no alarm sequence branch or an alarm sequence branch. Obviously, the no alarm transition branch takes no further action. When an alarm transition input is detected, two branches take place simultaneously or in parallel as shown by the double horizontal lines in FIG. 4. First, an alarm signal is generated typically by telephone to the police, security company, etc. Simultaneously, a security lights on action is generated.

A more complex furnace control sequence is shown in FIG. 5. When an input indicating that a room or home temperature requires heating to elevate the temperature to a selected preset or selected temperature, a first branch is selected and two actions take place in parallel or simultaneously, such as turning both the furnace oil pump and the furnace blower ignition. Next, a parallel path is selected wherein the temperature of the furnace bonnet is compared with the temperature at the blower. If the temperature in the bonnet is greater than the bonnet temperature at the blower, the blower is turned on in step 70. If the temperature is less than the temperature at the blower, the blower is turned off in step 72.

In a third branch, if the temperature of the furnace bonnet is less than the temperature at the blower and the furnace oil pump has been on for more than 60 seconds, a simultaneous branch takes place resulting in two parallel or simultaneous actions, such as turning off the oil pump and turning off the furnace ignition. In this sequence, a fault repair signal 46 is generated in the next step.

Math controls, not shown, are also possible in the combined Grafcet/ActiveX system of the present invention. A math step allows the definition of variables and expressions that set the values of these variables. Such variables are either numeric or Boolean and can be set to some mathematical function of other variables or properties of ActiveX controls or some combination thereof.

What is claimed is:

1. A computer apparatus for interactively developing a graphical control application software program for use in controlling an automation apparatus, the computer apparatus comprising:

means for storing an application development program including a first program representing a first set of flow sequences, each flow sequence including at least one transition and at least one step;

means for storing a plurality of controls for use in the automation apparatus, the plurality of controls each being an object obeying a standard which defines characteristics of the object as having one of a plurality of methods, one of plurality of properties, and one of a plurality of events;

each step in each flow sequence redefined as an object;

a display;

means for receiving user commands to select from the first program one of the first set of flow sequences, and for selecting one of the objects, the receiving means controlling the display to display a structure wherein the graphical representation of the selected one of the first set of flow sequences is a step in the structure and the selected object structure having at least one transition and at least one event; and means for linking the first program with the possible controls to directly form an automation program in response to user commands.

2. The apparatus of claim 1 wherein the transition is defined as one of a true statement, an event generated by a third party control, a Boolean expression defined by an internal variable, or an instantiated control, and an event from an instantiated control.

3. The apparatus of claim 1 wherein the control is instantiated when linked with a selected one of the flow sequences on the display.

4. The apparatus of claim 1 further comprising:

means for displaying and enabling the user to select one of the plurality of methods, one of the plurality of properties and one of the plurality of events for each control.

5. A method for developing a graphical control program and associated software for use in an automation apparatus utilizing a computer, the method comprising the step of:

storing a first control program representing a first set of flow sequences for use in operating an automation apparatus, each flow sequence including at least one transition and at least one step;

storing a plurality of controls as objects for use in the automation apparatus;

setting characteristics of the objects in the selected flow sequence as having one of a plurality of selectable methods, one of a plurality of selectable properties, and one of a plurality of selectable stored events for each selected object;

redefining each step in each flow sequence as an object;

displaying graphical representations of the objects;

receiving commands from a user to select one flow sequences from the first control program and to select one object;

linking the first control program with the objects; and displaying a graphical flow structure wherein the graphical flow structure includes the selected object mapped into the selected flow sequence and having at least one transition and at least one event, each transition adapted to be linked with at least one of an event and a property of an object.

6. A computer apparatus for interactively developing a graphical control application software program for use in controlling an automation apparatus, the computer apparatus comprising:

means for storing an application development program including a first program representing a first set of flow sequences;

means for storing a plurality of controls for use in the automation apparatus, the plurality of controls each being an object abeying a standard which defines characteristics of the objects as one of a plurality of methods, one of plurality of properties, and one of a plurality of events;

a display;

means for receiving user commands to select from the first program one of the first set of flow sequences, and for selecting one of the objects, the receiving means controlling the display to display a structure wherein the graphical representation of the selected one of the first set of flow sequences is a step in the structure and the selected object is mapped into the structure at the step, the displayed structure also having at least one transition and at least one event, each transition adapted to be linked with at least one of an event and a property of an object; and means for linking the first program with the possible controls to directly form an automation program in response to user commands.

* * * * *